United States Patent Office 3,116,108
Patented Dec. 31, 1963

3,116,108
PROCESS FOR THE GRANULATION OF
AMMONIUM NITRATE
Georges Edouard Joseph Brouwers, Schaerbeek-Brussels,
Walter Dumont, Brussels, and Rene Jean Edouard
Scoville, Grivegnee, Belgium, assignors to Societe Belge
de l'Azote et des Produits Chimiques du Marly,
Brussels, Belgium
No Drawing. Filed Mar. 1, 1960, Ser. No. 11,992
Claims priority, application France Mar. 5, 1959
5 Claims. (Cl. 23—103)

This invention relates to processes for the granulation of ammonium nitrate, and more particularly to the granulation of pure ammonium nitrate.

Various difficulties are encountered in the granulation of ammonium nitrate. These difficulties have the result that, the granular condition of the obtained product only partially corresponds to commercial specifications. This in turn results in a reduction of the efficiency of the processing units since a substantial portion of the product must be reprocessed.

It has been proposed to prepare fertilizing materials, which contain ammonium nitrate and do not cake, by adding or incorporating non-deliquescent salts such as, for example, aluminum sulphate, in a substantially anhydrous state and in a proportion of between 1 to 10% by weight, based on the amount of fertilizer. However, when applied under the same conditions to pure ammonium nitrate, this process is not useful, the resulting granulation being defective.

One of the most conventional industrial processes previously used for granulating ammonium nitrate comprises feeding melted ammonium nitrate into the top of a vertical tower, ammonium nitrate droplets being solidified therein upon contacting a counter-current of air. This process involves high installation costs, the towers generally being very high, and the resulting granules are hollow and have a poor mechanical resistance.

It is an object of this invention to overcome these shortcomings and to provide a process advantageously used on industrial scale in conventional equipment for the granulation of fertilizers.

Briefly, according to the invention, there is provided a process which comprises mixing a solution of pure ammonium nitrate at a concentration higher than 95%, with 0.1 to 1% by weight of hydrated aluminum sulphate to obtain a homogeneous mixture having a temperature between 165 and 170° C., introducing said mixture into a granulating device and then carrying out successively the final hardening, the drying and the cooling of the granules in a rotating cylinder traversed by air in counter-current with the granules, the temperature of said granules being between 80 and 90° C.

More particularly, a solution of pure ammonium nitrate is concentrated to obtain a solution of at least 95%, and preferably 95–96.5%, corresponding to a temperature of 175 to 180° C. Hydrated aluminum sulphate (including its crystallization water) is added to this concentrated solution of ammonium nitrate. Under the effect of the heat of the solution of pure ammonium nitrate, the aluminum sulphate loses its crystallization water and then, during the granulation, recovers said crystallization water, resulting thereby in a hardening of the ammonium nitrate grains. Preferably, there is used aluminum sulphate having 17 water molecules, $Al_2(SO_4)_3 \cdot 17H_2O$. Comparative experiments have shown that the results of the granulation are less advantageous when using less hydrated aluminum sulphate or less concentrated nitrate solutions.

The proportion of aluminum sulphate with 17 water molecules, added to the solution of pure ammonium nitrate may vary from 0.1 to 1% by weight, based on the amount of ammonium nitrate and is preferably in the range of 0.30 to 0.50%. Proportions higher than 1% are not profitable to the operation and are not interesting from the economical point of view. On the other hand, with small proportions of aluminum sulphate in the neighborhood of or lower than 0.1%, the granulation of the ammonium nitrate is not regular and the resulting granules do not have the desired physical properties with respect to hardness and stability. The proportion of aluminum sulphate to be added depends both on the desired purity of the granulated ammonium nitrate and the grade of the obtained granules. In the practice, this proportion is limited to 0.30 to 0.50% by weight, based on the amount of starting ammonium nitrate.

The melted mixture of ammonium nitrate and aluminum sulphate is introduced into a granulating device, in which it enters at a temperature of approximately 170° C. The fine product formed in a previous operation is recycled to said granulating device, the proportion of the recycled fine product being generally between two and three times the weight of the ammonium nitrate contained in the melted mixture of ammonium nitrate and aluminum sulphate. The aluminum sulphate, which has lost its crystallization water due to its mixture with the hot ammonium nitrate, recovers said water during the granulation, resulting in an important hardening of the grains. The grains leave the granulating device at a temperature of approximately 100 to 105° C.

They are then directly introduced into a conventional device for final hardening, drying and cooling, the device consisting of a trommel traversed by air in counter-current with the granules. Numerous experiments have shown that the temperature of the granules at the outlet of the trommel should be between 80 and 90° C. At temperatures higher than 90° C., the granules leaving the dryer have a too irregular form, while at temperatures lower than 80° C., the ammonium nitrate has a powdery appearance. It has been found that, under such circumstances and while taking the economy of the process into consideration, the preferred temperature of the granules leaving the trommel should be between 80 and 85° C.

Under such circumstances, there is obtained ammonium nitrate having a purity of at least 99.5% and in the form of hard and full-spherical granules. Said granules are passed through a sieve to retain those with a diameter between 1.75 and 4.5 mm., which form the finished product, the finer granules being recycled to the granulating device.

*Example*

1 ton of hydrated aluminum sulphate, $$Al_2(SO_4)_3 \cdot 17H_2O$$

is added to 200 tons/day of an ammonium nitrate solution concentrated to 96.5%, the mixture being heated to 176° C. at the inlet of the granulating device. The latter consists, for example, of a device with rotating blades having alternately inverse rotation motions and engaging into each other (Patouillet system). The mixture of ammonium nitrate and aluminum sulphate, introduced at a temperature of approximately 168° C., is kneaded with fine ammonium nitrate from a previous operation (400 tons/day) and having a temperature of 70–75° C. and this new mixture is granulated. The granules leave the device at a temperature of from 100 to 102° C. and they pass directly through a trommel in which they are dried with counter-current air at a rate of 15,000 to 18,000 cubic meters/hour. The granules leave the device at 65–70° C. The dried and hardened granules at a temperature of 85° C. are passed through a sieve.

Under such circumstances, there is obtained approximately 180 tons/day of ammonium nitrate having a minimum total nitrogen content of 34.5% in the form of spherical, full and hard granules having a diameter between 1.75 and 4.5 mm., said granules forming the commercial product. There is also obtained approximately 330 tons of finer product. With respect to the product of higher grain size, it is ground, yielding thereby approximately an additional 20 tons/day wtih a grain size between 1.75 and 4.5 mm. and 70 tons of fine product.

Finally, there is thereby obtained approximately 200 tons/day of commercial finished product and approximately 400 tons of fine product, which is recycled to the granulating device.

What is claimed is:

1. A process for the preparation of non-caking, hard granules consisting of essentially pure ammonium nitrate, comprising providing a homogeneous mixture of an aqueous solution of at least 95% of said pure ammonium nitrate and between 0.1 to 1% by weight of hydrated aluminum sulfate at a temperature between about 165° C. and 170° C. such that the hydrated aluminum sulphate loses its crystallization water, granulating and drying said mixture in air moving countercurrent to the granules such that the aluminum sulphate re-covers its crystallization water, then hardening, drying and cooling the said granules to a temperature between about 80° C. and 90° C.

2. The process of claim 1, wherein the hydrated aluminum sulfate contains seventeen molecules of water.

3. The process of claim 1, wherein the sulfate is used in an amount between 0.3% and 0.5% by weight.

4. The process of claim 3 wherein the final granules are sieved to obtain a product having a size from about 1.75 mm. to about 4.5 mm., and also a finer product, and a coarser product.

5. The process of claim 4 wherein said finer product is utilized as a source of ammonium nitrate in preparing said homogeneous mixture.

References Cited in the file of this patent

UNITED STATES PATENTS

| | | |
|---|---|---|
| 1,966,947 | Eyer et al. | July 17, 1934 |
| 2,782,108 | Antle | Feb. 19, 1957 |
| 2,792,288 | Gordon | May 14, 1957 |
| 2,798,301 | Antle | July 9, 1957 |